United States Patent [19]

MacLeay et al.

[11] 4,075,199
[45] Feb. 21, 1978

[54] TERTIARY ALIPHATIC ALPHA-PEROXYAZO COMPOUNDS

[75] Inventors: Ronald Edward MacLeay, Williamsville; Chester Stephen Sheppard, Tonawanda; Harold Carl Lange, Grand Island, all of N.Y.

[73] Assignee: Pennwalt Corporation, Philadelphia, Pa.

[21] Appl. No.: 426,411

[22] Filed: Dec. 19, 1973

Related U.S. Application Data

[63] Continuation of Ser. No. 88,110, Nov. 9, 1970, abandoned, which is a continuation-in-part of Ser. No. 725,180, April 29, 1968, abandoned, which is a continuation of Ser. No. 616,158, Feb. 15, 1967, abandoned, which is a continuation of Ser. No. 409,306, Nov. 5, 1964, abandoned.

[51] Int. Cl.$^2$ .................... C07C 107/02; B01J 27/24; C08J 9/00; C08G 63/12
[52] U.S. Cl. .................... 260/192; 260/2.5 R; 260/75 N; 260/75 NQ; 260/75 T; 260/152; 260/156; 260/174; 260/193; 520/219; 252/438
[58] Field of Search .................... 260/192, 193

[56] References Cited

U.S. PATENT DOCUMENTS

| | | | |
|---|---|---|---|
| 2,813,127 | 11/1957 | White | 260/610 |
| 3,247,259 | 4/1966 | Bafford et al. | 260/610 |
| 3,282,912 | 11/1966 | Benzing | 260/158 |

Primary Examiner—Floyd D. Higel

[57] ABSTRACT

Tertiary-aliphatic alpha-peroxyazo compounds represented by the structure

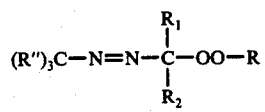 (I);

processes for preparing these compounds by reacting

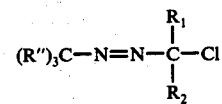 (II)

with salts or salt solutions of

HOOH (III), (R")$_3$COOH (IV),

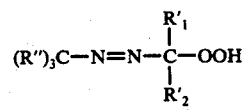 (V) or

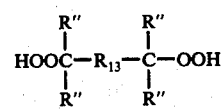 (VI);

and the use of these novel compounds as polymerization initiators for vinyl monomers and as curing agents for resins. For example, 2-t-butylazo-2-(t-butylperoxy)-propane is prepared by reacting the potassium salt of t-butyl-hydroperoxide with 2-t-butylazo-2-chloropropane; and the product is used to cure unsaturated polyester resin at room temperature and to polymerize vinyl chloride at 20°–30° C.

8 Claims, No Drawings

TERTIARY ALIPHATIC ALPHA-PEROXYAZO COMPOUNDS

CROSS REFERENCE TO RELATED APPLICATIONS

This is a continuation of application Ser. No. 88,110, filed Nov. 9, 1970, (now abandoned) which in turn is a continuation-in-part of application Ser. No. 725,180, filed Apr. 29, 1968 (now abandoned), which in turn is a continuing application of application Ser. No. 616,158, filed Feb. 15, 1967 (now abandoned), which is a continuing application of application Ser. No. 409,306, filed Nov. 5, 1964 (now abandoned).

BACKGROUND OF THE INVENTION

This disclosure relates to novel tertiary alkyl, cycloalkyl or aralkyl azo compounds containing an α-tertiary aliphatic peroxy group as represented by the formula

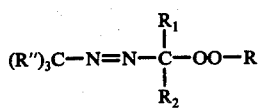

(I), to processes for their preparation and to their use as polymerization initiators for vinyl monomers and as curing agents for polyester resin compositions.

To the best of applicants' knowledge, no azo-peroxides of structure I have been previously reported, though the combination of azo and peroxide groups in the same molecule is disclosed in U.S. Pat. No. 3,282,912 and Canadian Pat. No. 750,380 (structures VII and VIII, respectively):

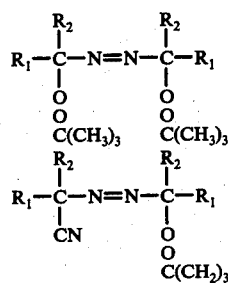
(VII)

(VIII)

The VII compounds are symmetrical azo compounds and thus fall into a completely different category from the compounds of the instant case. The VIII compounds also differ significantly in structure since R'' of the compounds (I) of the instant invention does not include cyano or other functional groups which could create toxicity problems.

BRIEF SUMMARY OF THE INVENTION

This invention relates to:

(A) Novel t-alkyl, cycloalkyl and aralkyl azo compounds ("t"=tertiary) containing an α-tertiary aliphatic peroxy group:

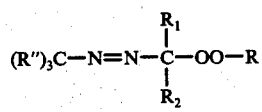

(I)

where:
$(R'')_3C$ is a $C_4$ to $C_{20}$ t-alkyl, cycloalkyl, alkylcycloalkyl, arylcycloalkyl or aralkyl radical where R'' is a $C_1$ to $C_8$ alkyl, alkynyl or alkenyl, $C_7$ to $C_{12}$ aralkyl or $C_6$ to $C_{14}$ aryl radical, not more than one R'' being aromatic, and where 2 or 3 of said R''s can join with the tertiary carbon atom to form a cyclo-, bicyclo- or tricyclo radical of 3 to 12 carbons;

R is a tertiary aliphatic radical selected from $-C(R'')_3$,

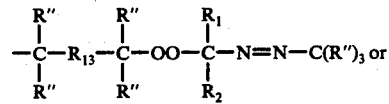

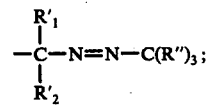

$R_1$, $R'_1$, $R_2$ and $R'_2$ are separately selected from a $C_1$ to $C_8$ alkyl, $C_3$ to $C_{12}$ cyclo-, bicyclo- or tricycloalkyl, $C_7$ to $C_{12}$ aralkyl, $C_6$ to $C_{14}$ aryl or 5 to 6 membered heterocyclic radical or, taken together, $R_1$ and $R_2$ and/or $R'_1$ and $R'_2$ can form a $C_3$ to $C_{11}$ alkylene or cycloalkyl-alkylene diradical; and one or more of each of said $R_1$s, $R'_1$s, $R_2$s and $R'_2$s can be substituted with lower alkoxy, hydroxy, carboxy, alkoxycarbonyl, acyloxy, halogen, cyano, amido or alkylsulfonato radicals; and $R_{13}$ is $C_1$ to $C_9$ alkyl, alkynyl, alkenyl, cycloalkyl or aryl diradical;

(B) A method for preparing the novel I compounds by reacting tertiary aliphatic α-chloroazo compounds

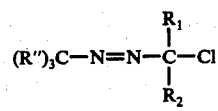

(II)

with alkali metal (e.g. sodium or potassium) or alkaline earth metal (e.g. calcium or barium) salts or solutions of these salts of the following hydroperoxides:

HOOH     (III)

(used to prepare I where

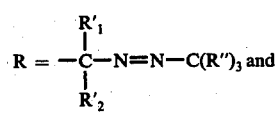

where $R_1 = R'_1$ and $R_2 = R'_2$);

$(R'')_3COOH$     (IV)

(to prepare I when $R = -C(R'')_3$);

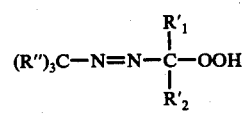

(V)

(to prepare I where

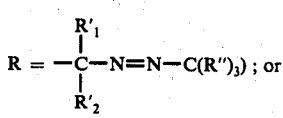 (VI)

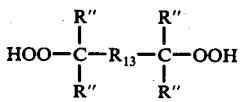

(to prepare I where

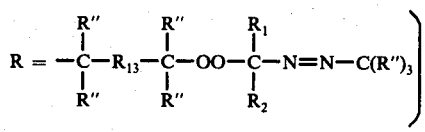

where R", $R_1$, $R_2$, $R'_1$, $R'_2$ and $R_{13}$ are as defined above;

(C) The use of the novel I compounds as polymerization initiators (free radical generators) for the homo- or copolymerization of ethylenically unsaturated monomers which are responsive at suitable temperatures to free radical generators, especially for initiating vinyl chloride polymerizations in the 10°–60° C. temperature range; and (D) The use of the novel I compounds as curing agents (free radical initiators) for the curing of unsaturated polyester resin compositions in the presence of said novel I compounds, especially for curing unsaturated polyester-vinyl monomer blends at temperatures of 20°–90° C., preferably near ambient temperatures.

DETAILED DESCRIPTION OF INVENTION

Process

Preparation of the above described intermediate tertiary-aliphatic α-chloroazo compounds (II) is described in our copending application Ser. No. 725,180, filed Apr. 29, 1968; and preparation of the intermediate tertiary-aliphatic azo hydroperoxides (V) and their salts is described in our copending application Ser. No. 88,249 filed concurrently herewith on Nov. 9, 1970 entitled "Aliphatic α-(Hydroperoxy)Azo Compounds and Salts Thereof".

The reactions of II with III, IV, V or VI can be run in water, alcohols and inert solvents such as ethers, hydrocarbon solvents, dimethylformamide or dimethyl sulfoxide. When the lower molecular weight t-alkyl hydroperoxides such as t-butyl, α,α-dimethylbenzyl, t-amyl or t-octyl hydroperoxides or hydrogen peroxides which readily form aqueous salt solutions are employed, the preferred solvent is water. The water reacts to a small extent with the structure II compound to form the α-hydroxy azo XII as an impurity. When the lower molecular weight alcohols such as methanol, ethanol or isopropanol are used as the solvent, the structure II compound reacts to a small extent with the solvent to form the α-alkoxy azo (XIII) as an impurity.

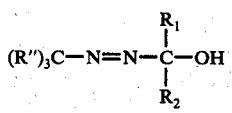 (XII)

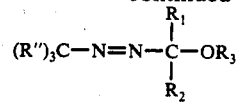 (XIII)

$R_3$ = methyl, ethyl, isopropyl.

When the higher molecular weight t-aliphatic hydroperoxides, which do not form salts readily in aqueous solution such as X (when $R'_1$ or $R'_2$ is larger than $CH_3$) are employed, the preferred solvent is an inert solvent such as ethers or hydrocarbons in combination with the anhydrous salt of X.

The reaction can be run at −10° to 40° C but preferably at 15° to 25° C. This allows for a reasonable reaction rate and a minimum of decomposition. At the lower temperature the rate of the reaction of the II compounds with the salts of the dihydroperoxides slows down and the side reactions (reaction with water or alcohols) become more pronounced. At the higher temperatures, the yield begins to suffer due to partial thermal decomposition of the product. One also increases the chance of having a rapid decomposition of the product occurring when operating at the higher temperatures. When an aqueous or methanolic system is employed, the α-chloro-azo compound (II) should be added to the hydroperoxide solution. In this manner there will always be an excess of the hydroperoxide which will keep the side reactions with the water or alcohol at a minimum. In the reverse addition, the α-chloro-azo compound (II) would be in excess throughout the first three-fourths of the reaction and could readily react with the water and/or alcohol present. The α-chloro-azo compound (II) can be added neat or in a solution of an inert solvent such as ethers, hydrocarbons or chlorinated hydrocarbons. The reaction of the α-chloro-azo compound (II) with the hydroperoxide is moderately exothermic so the α-chloro-azo compound must be added slow enough and with sufficient cooling that the reaction temperature does not exceed the prescribed temperature range. Although some reaction will occur no matter what the mole ratios of the reagents are, it is preferable to use a slight equivalent excess of the hydroperoxide salt to minimize the side reactions. In addition we have found that the results are even better if a small amount of the free hydroperoxide is also present. This can be removed in most cases by a basic wash after the reaction is over. Due to the low thermal stability of these compounds, it is essential that once the product is formed, the washes and subsequent workup should be carried out below room temperature, preferably between 0°–5° C. Likewise, any containers for holding these products should be precooled before the azo-peroxide is added to it. The novel I compounds should be stored below 0° C; preferably around −20° C. to prevent thermal decomposition. The novel I compounds are very susceptible to acid decomposition and practical grades of hydrocarbons should be washed with $NaHCO_3$ solutions and dried before using as diluents. It is recommended that the novel I compounds be diluted with inert solvents such as hydrocarbons to at least 75% and preferably 50% for safety reasons. Some of the novel I compounds are shock sensitive in the pure form. Consequently, care must be exercised in the low temperature storage of these compounds where the pure material may crystallize out of solution upon storage at very low temperatures.

Utility

These new compositions are free radical generators, polymerization initiators for vinyl monomers, curing agents for polyester resins, initiators for free radical initiated chemical reactions, blowing agents for producing foamed polymers and plastics, selective oxidizing agents and generators of reactant free radicals.

It has been observed that these new compositions are initiators for the polymerization or copolymerization of unsaturated monomers such as alkenes, vinyl halides, vinyl esters, vinylidene halides and alkenyl aromatics.

Illustrative polymerizable monomers are ethylene, vinyl chloride, vinylidene chloride, vinyl acetate, vinyl-pyridine, vinyl-pyrrolidone, vinyl-carbazole, butadiene, isoprene, acrylonitrile, acrylic acid, acrylic acid esters, methacrylic acid, methacrylic acid esters, styrene, chlorostyrene, methylstyrenes and in the high pressure polymerization of ethylene.

It is a further advantage of these compounds that many of these polymerizations can be carried out at room temperature or below without needing any activators or co-catalysts present. This is especially true in the case of vinyl chloride. In addition these compounds are very efficient polymerization initiators. Specific illustrations are given in the working examples.

These compounds are also very efficient curing agents of polyester resins, even at very low levels of catalyst concentration, at room temperature. The cured polyester resins were water white or off white in color and very hard.

Unsaturated polyesters which are used as the one component of the polyester resin compositions according to the present invention are, for instance, polyesters as they are obtained by esterifying preferably ethylenically unsaturated di-or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2'-dihydroxy ethyl ether); triethylene glycol (ethylene glycol bis(2-hydroxy ethyl ether); propanediol-1,2; butanediol-1,3; 2,2-dimethyl propanediol-1,3; butene (2)-diol-1,4, glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, hydrophthalic acid, and others and their anhydrides such as phthalic anhydride. The acids used as well as the alcohols employed may be substituted by other substituents, preferably by halogen. Examples of suitable halogenated acids are, for instance, tetrachloro phthalic acid; 1,4,5,6,7,7-hexachloro bicyclo (2,2,1) heptene (5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate, ethyl acrylate, and others, which are copolymerizable with said polyesters.

A preferred resin composition contains as the polyester component the esterification product of propylene glycol (a polyalcohol), maleic anhydride (anhydride of an unsaturated dicarboxylic acid) and phthalic anhydride (anhydride of an aromatic dicarboxylic acid) and as the monomer component styrene.

Compounds

Many novel compounds of the present invention are taught in the examples to follow. Additional compounds which can be prepared according to this invention include:

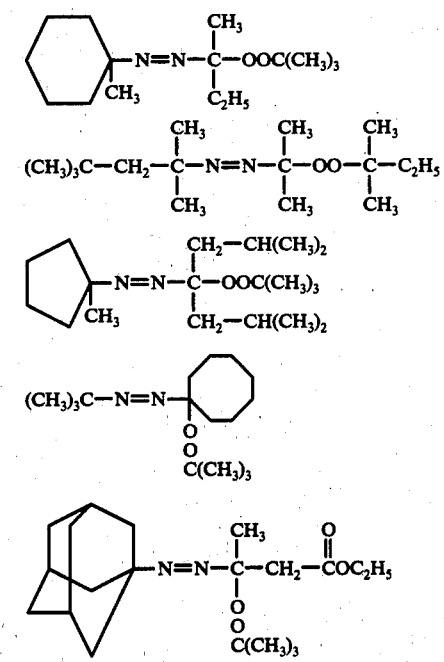

-continued
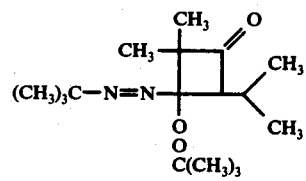
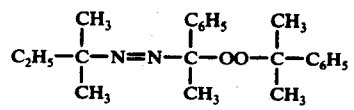
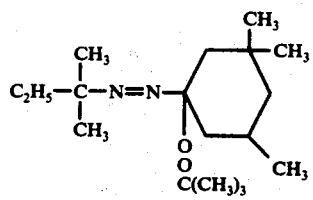
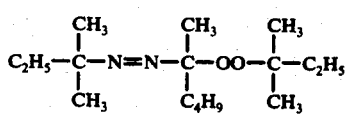
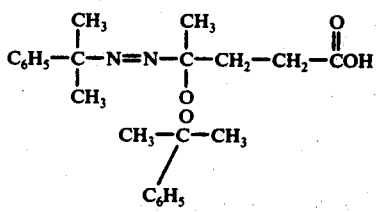
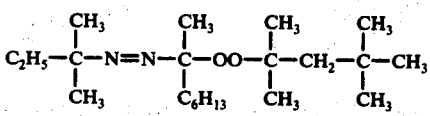
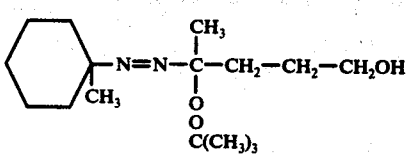
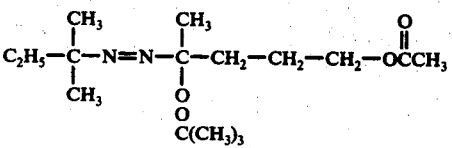
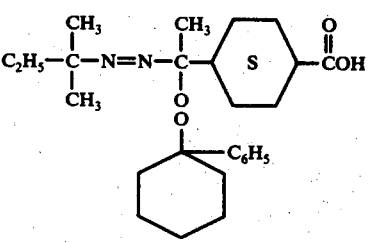
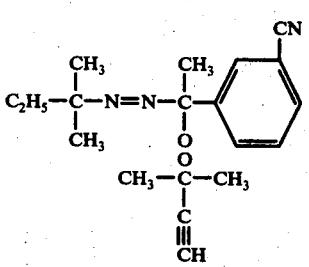

-continued
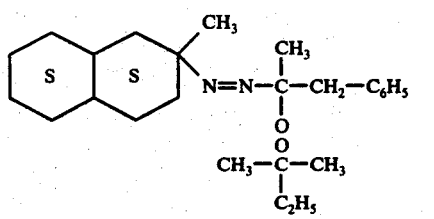
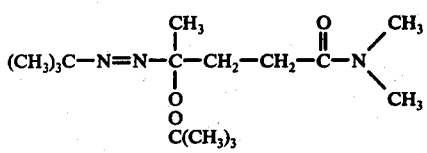
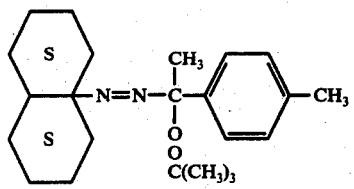
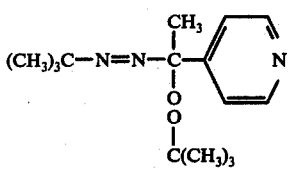
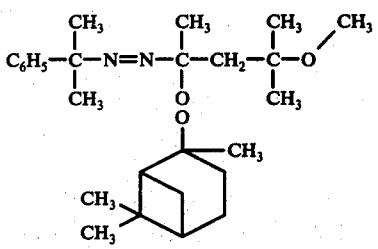
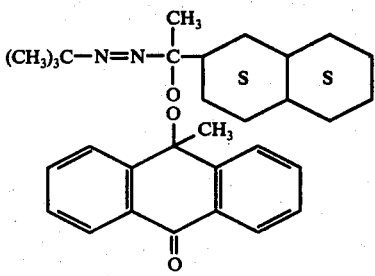
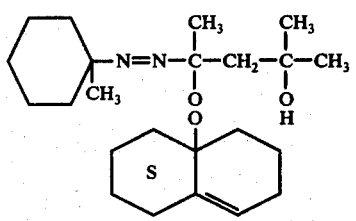
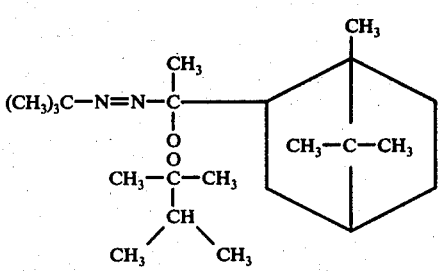

-continued
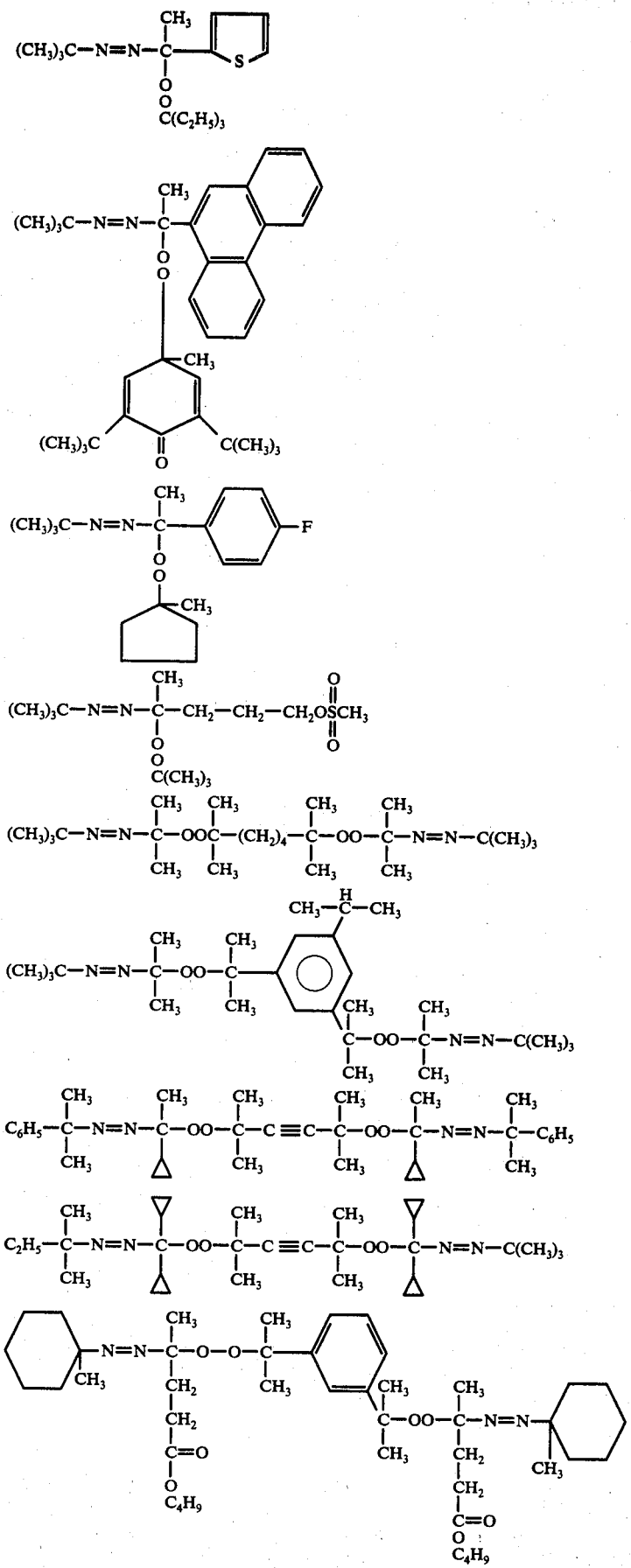

-continued

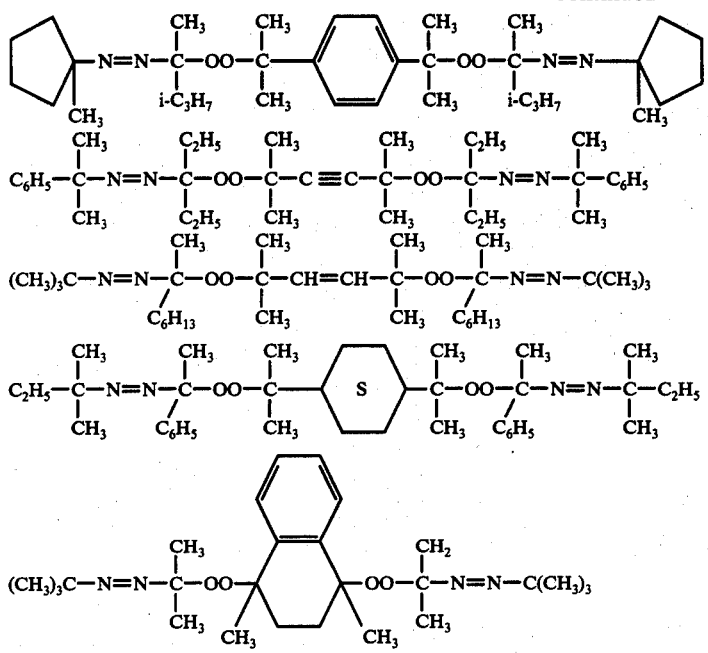

EXAMPLES

The following examples illustrate the invention but in no way limit the scope thereof.

EXAMPLE I

Preparation of 2-(t-Butylazo)-2-(t-butylperoxy)-propane

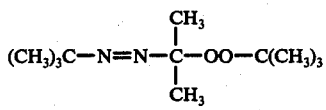

To a solution of 72.5 grams (1.1 moles) of 85% potassium hydroxide in 175 ml. of water, cooled to 15° C in a 2 liter jacketed reactor was added 140 grams (1.4 moles) of 90% t-butylhydroperoxide slowly and with rapid stirring. The temperature was held at 20°–25° C by the rate of addition and by circulating 15° C water through the reactor jacket. After the addition was complete, the reaction was stirred for 15 minutes at 15° C and then 165 grams (1.015 moles) of 2-t-butylazo-2-chloropropane was added dropwise over a 30 minute period holding the reaction temperature at 18°–20° C. After the addition was complete the reaction was stirred for 15 minutes at 18° C. It was then cooled to 0°–5° C and stirred for 90 minutes. A 0.3 mole (24 grams) portion of 50% NaOH was then added and the reaction stirred for 15 minutes. Ice water was then added until the potassium chloride dissolved. The mixture was extracted with 300 ml. of pentane, the pentane extract washed with ice cold water, saturated NaHCO$_3$ solution, dried over anhydrous sodium sulfate, filtered and the pentane evaporated under reduced pressure at 10° C to leave 187 grams (85% yield) of crude 2-t-butylazo-2-(t-butylperoxy)-propane. A pure sample of the azo-peroxide was obtained by low temperature recrystallization from reagent grade pentane. The recrystallization was repeated two more times and the purified material was used as an analytical standard. The crude azo-peroxide assayed 77.1% when compared with the analytical standard using an infrared analysis technique. The crude azo-peroxide was then diluted to 50% in cold odorless mineral spirits for safety reasons. The pure azo-peroxide is very shock sensitive and is also sensitive to acids and metal ions. The compound decomposes thermally at room temperature and must be stored at least at 0° C and for any prolonged storage at −20° C or below.

The other major component in the crude azo-peroxide is 2-t-butylazo-2-hydroxypropane, a side product which results from a portion of the 2-t-butylazo-2-chloropropane reacting with water or KOH instead of the potassium salt of the hydroperoxide.

EXAMPLE II

Curing an Unsaturated Polyester-Styrene Resin with 2-(t-Butylazo)-2-(t-butylperoxy)-propane An unsaturated polyester resin was made by reacting maleic anhydride (1.0 mole), phthalic anhydride (1.0 mole), and propylene glycol (2.2 moles) until an acid number of 45–50 was obtained. To this was added hydroquinone at a 0.013% concentration. Seven parts of this unsaturated polyester was diluted with 3 parts of monomeric styrene to obtain a homogeneous blend having a viscosity of 13.08 poise and a specific gravity of 1.14.

To 20 grams of this blend was added 0.2 grams of crude 2-t-butylazo-2-(t-butylperoxy)-propane and the mixture stirred up well with a wooden spatula. The internal temperature was recorded as a function of time and a peak exotherm of 250° F (121° C) was reached in 5.5 minutes indicating an excellent cure of the unsaturated polyester-styrene resin blend had occured. The resultant cured material was very hard and was water white in color.

Without an initiator, no cure of this resin blend occurred even after more than 30 minutes at 212° F (100° C).

EXAMPLE III

Polymerization of Vinyl Chloride with 2-(t-Butylazo)-2-(t-butylperoxy)-propane 2-t-Butylazo-2-(t-butylperoxy)-propane of Example I was used as an initiator in the polymerization of vinyl chloride using the well known bottle polymerization technique at autogenous pressures. The formulation used in evaluation is set out below:

| | |
|---|---|
| Vinyl chloride monomer | 100 grams |
| Water (distilled) | 210 ml. |
| Methocel* (1500cps) (1% solution) | 20 ml. |
| Sorbitan monostearate (1% solution) | 10 ml. |
| Polyoxyethylene sorbitan monostearate (1% solution) | 10 ml. |
| Crude 2-t-Butylazo-2-(t-butylperoxy)-propane | (variable) |

*A hydroxypropyl methylcellulose product of Dow Chemical.

A water suspension was prepared as set out in the above formulation and added to a 24 ounce beverage bottle which was then frozen at −20° C. A series of bottles was prepared and varying amounts of the initiator added, followed by the freshly distilled vinyl chloride. The bottles were capped and placed in a water bath thermostatted at 30° C. The bath was equipped to cause the rotation of the bottles end over end. After the polymerization had continued at 30° C for 16 hours, the bottles were cooled, vented of excess vinyl chloride monomer, and the yield of polyvinyl chloride determined gravimetrically. It was found that .025 grams of 2-t-butylazo-2-(t-butylperoxy)-propane were required per 100 grams of vinyl chloride monomer to obtain a 90% conversion to poly(vinyl chloride). Using a reaction cycle of 16 hours at 18° C, 0.041 grams of the azo-peroxide were required to obtain 90% conversion.

EXAMPLE IV

Preparation of 2-(t-Butylazo)-2-(t-butylperoxy)-4-methylpentane

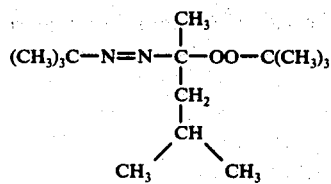

To a solution of 36.2 grams (0.55 moles) of 85% potassium hydroxide in 75 ml. of water, cooled to 15° C in a 2 liter jacketed reactor was added 70 grams (0.70 moles) of 90% t-butylhydroperoxide slowly and with rapid stirring. The temperature was held at 20°–25° C by the rate of addition and by circulating 15° C water through the reactor jacket. After the addition was complete, the reaction was stirred for 20 minutes at 15° C and then 102 grams (0.5 moles) of 2-t-butylazo-2-chloro-4-methylpentane was added dropwise over a 40 minute period holding the temperature at 18°–20° C. After the addition was complete the reaction was stirred for 15 minutes at 20° C. It was then cooled to 0°–5° C and stirred for 45 minutes. A 0.2 mole (16 grams) portion of 50% NaOH was then added and the reaction stirred for 15 minutes. Ice water was then added until the potassium chloride dissolved. The mixture was extracted with 200ml. of pentane, the pentane extract washed with ice cold water, saturated NaHCO₃ solution, dried over anhydrous sodium sulfate, filtered and the pentane evaporated under reduced pressure at 10° C to leave 114.2 grams (89% yield) of crude 2-t-butylazo-2-(t-butylperoxy)-4-methylpentane. The crude azo-peroxide assayed 82% when compared with an analytical standard obtained by low temperature recrystallization using an infrared analysis technique.

The crude azo-peroxide was then diluted to 40% in heptane for safety reasons and stored at −20° C or below. The heptane solvent was washed with saturated NaHCO₃ solution to remove any acid impurities and dried before diluting the azo-peroxide.

The other major component in the crude azo-peroxide is 2-t-butylazo-2-hydroxy-4-methylpentane, a side product which results from a portion of the 2-t-butylazo-2-chloro-4-methylpentane reacting with water or KOH instead of the potassium salt of the hydroperoxide.

At a 1.0 weight percent loading the crude 2-t-butylazo--2-(t-butylperoxy)-4-methylpentane cured the unsaturated polyester-styrene resin of Example II at room temperature giving a peak exotherm of 275° F (135° C) in 4.9 minutes and a very hard cured resin which was water white in color.

In the polymerization of vinyl chloride as in Example III, it was found that 0.028 grams of 2-t-butylazo-2-(t-butylperoxy)-4-methylpentane were required per 100 grams of vinyl chloride monomer to obtain 90% conversion to poly(vinyl chloride) using a reaction cycle of 16 hours at 30° C. Using an 8 hour cycle at 20° C, 0.077 grams of the azo-peroxide were required to obtain 90% conversion to poly(vinyl chloride).

EXAMPLE V

Preparation of 2-(t-Butylazo)-2-(t-butylperoxy)-4-methoxy-4-methylpentane

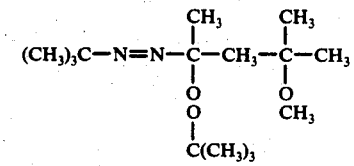

To a solution of 72.5 grams (0.55 moles) of 85% potassium hydroxide in 175 ml. of water cooled to 15° C in a 2 liter jacketed reactor was added 140 grams (1.4 moles) of 90% t-butylhydroperoxide slowly and with rapid stirring. The temperature was held at 20°–25° C by the rate of addition and by circulating 15° C water through the reactor jacket. After the addition was complete, the reaction was stirred for 15 minutes at 15° C and then 234 grams (1.0 moles) of 2-t-butylazo-2-chloro-4-methylpentane was added dropwise over a 30 minute period holding the temperature at 15°–20° C. After the addition was complete the reaction was stirred for 90 minutes at 0°–5° C. A 25 gram (.313 moles) portion of 50% NaOH was then added and the reaction stirred for 15 minutes to remove the excess t-butyl hydroperoxide. Ice water was then added until the potassium chloride dissolved. The mixture was extracted with 200ml. of pentane, the pentane extract washed with ice cold water, saturated NaHCO₃ solution, dried over anhydrous sodium sulfate, filtered and the pentane evaporated under reduced pressure at 10° C to leave 214.5 grams (74.5% yield) of crude 2-t-butylazo-2-(t-butylperoxy)-4-methoxy-4-methylpentane. The crude azo-peroxide assayed 81.5% when compared with an analytical standard obtained by low temperature recrystallization using an infrared analysis technique. The product was stored in a dry ice chest where it slowly solidified.

EXAMPLE VI

Preparation of 1-(t-Butylazo)-1-(t-butylperoxy)-cyclohexane

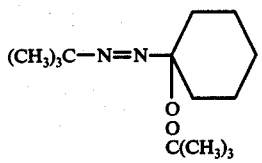

To a solution of 42 grams (0.64 moles) of 85% potassium hydroxide in 100 ml. of water, cooled to 15° C in a 2 liter jacketed reactor was added 81 grams (0.81 moles) of 90% t-butylhydroperoxide slowly and with rapid stirring. The temperature was held at 20°-25° C by the rate of addition and by circulating 15° C water through the reactor jacket. After the addition was complete, the reaction was stirred for 30 minutes at 20° C and then 118 grams (0.58 moles) of 1-t-butylazo-1-chlorocyclohexane was added dropwise over a 30 minute period holding the temperature at 20°-22° C. After the addition was complete the reaction was stirred for 15 minutes at 20° C. It was then cooled to 0°-5° C and stirred for 90 minutes. A 0.2 mole (16 grams) portion of 50% NaOH was then added and the reaction stirred for 15 minutes. Ice water was then added until the potassium chloride dissolved. The mixture was extracted with 200ml. of pentane, the pentane extract washed with ice cold water saturated NaHCO₃ solution, dried over anhydrous sodium sulfate, filtered and the pentane evaporated under reduced pressure at 10° C to leave 130 grams (88% yield) of crude 1-t-butylazo-1-(t-butylperoxy)-cyclohexane. The product was stored in a dry ice chest.

At a 1.0 weight percent loading the crude 1-t-butylazo-1-(t-butylperoxy)-cyclohexane cured the unsaturated polyesterstyrene resin of Example II at room temperature giving a peak exotherm of 306° F (152° C) in 2.1 minutes and a very hard cured resin.

In the polymerization of vinyl chloride as in Example III, it was found that 0.021 grams of 1-t-butylazo-1-(t-butylperoxy)-cyclohexane were required per 100 grams of vinyl chloride monomer to obtain 90% conversion to poly(vinyl chloride) using a reaction cycle of 16 hours at 30° C.

EXAMPLE VII

Preparation of 2-(t-Butylazo)-2-(t-cumylperoxy)-4-methylpentane

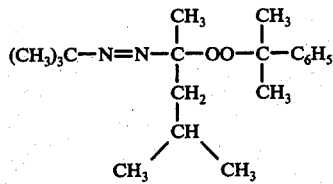

To a cooled solution of 9.23 grams (0.14 moles) of 85% potassium hydroxide in 30 ml. of water in a 200 ml. beaker immersed in an ice bath was added 25.9 grams (0.14 moles) of 80% cumene hydroperoxide. The reaction mixture was stirred for 15 minutes and then extracted with pentane to remove any cumene of cumyl alcohol present. The aqueous solution was then added to a 250 ml. reaction flack equipped with a magnetic stirrer, thermometer and addition funnel. The solution was cooled to 15° C in a cold water bath and 20.4 grams (0.1 moles) of 2-t-butylazo-2-chloro-4-methylpentane added dropwise over a 30 minute period, holding the temperature at 20° C with the cold water bath. After the addition was complete, the reaction was cooled to 0°-5° and stirred for 2 hours, poured into 150 ml. of cold water and extracted with pentane. The pentane solution was washed with ice cold water, saturated NaHCO₃ solution, dried over anhydrous sodium sulfate, filtered and the pentane evaporated under reduced pressure to leave 32.3 grams (101% yield) of crude 2-t-butylazo-2-(t-cumylperoxy)-4-methylpentane. The product was stored in a dry ice chest.

At a 1.0 weight percent loading the crude 2-t-butylazo-2-(t-cumylperoxy)-4-methylpentane cured the unsaturated polyester-styrene resin of Example II at room temperature giving a peak exotherm of 302° F (150° C) in 1.7 minutes and a very hard cured resin.

In the polymerization of vinyl chloride as in Example III, it was found that 0.08 grams of 2-t-butylazo-2-(t-cumylperoxy)-4-methylpentane were required per 100 grams of vinyl chloride monomer to obtain 80% conversion to poly(vinyl chloride) using a reaction cycle of 16 hours at 22° C.

EXAMPLE VIII

Preparation of 2-(t-Butylazo)-2-(t-cumylperoxy)-propane

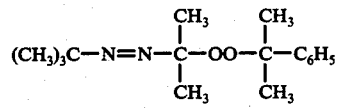

The 2-t-Butylazo-2-(t-cumylperoxy) propane was prepared in 84% crude yield from 10.7 grams (.0659 moles) of 2-t-butylazo-2-chloropropane and 17.6 grams (.0922 moles) of 80% cumene hydroperoxide. The procedure was the same as that described in Example VII.

At a 1.0 weight percent loading the crude 2-t-butylazo-2-(t-cumylperoxy)-propane cured the unsaturated polyesterstyrene resin of Example II at room temperature giving a peak exotherm of 309° F (154° C) in 2.3 minutes and a very hard cured resin.

In the polymerization of vinyl chloride as in Example III, it was found that 0.051 grams of 2-t-butylazo-2-(t-cumylperoxy)-propane were required per 100 rams of vinyl chloride monomer to obtain 90% conversion to poly(vinyl chloride) using a reaction cycle of 16 hours at 22° C.

EXAMPLE IX

Preparation of 4-(t-Butylazo)-4-(t-butylperoxy)valeric Acid

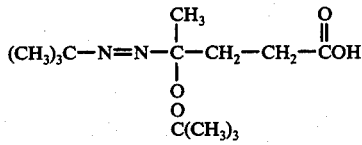

To a solution of 12.0 grams (.15 moles) of 50% NaOH in 50 ml. methanol, cooled to 0° C in a 250 ml. reaction flask immersed in an ice bath, was added 11.5 grams (.0365 moles) of allyl 4-t-butylazo-4-(t-butylperoxy)valerate dropwise and with rapid stirring. After the addition was complete, the reaction was stirred for 3½ hours at 0°-5° C, poured into 200 ml. of ice water and the solution extracted with pentane to remove any unreacted ester. The aqueous solution of sodium 4-t-butylazo-4-(t-butylperoxy)valerate was acidified at 0° C by the dropwise addition of HCl until the pH of the solution reached 5. The aqueous solution was immediately extracted with cold pentane, the pentane extract washed with ice cold water, dried over anhydrous sodium sulfate, filtered and the pentane evaporated under reduced pressure to give 6.5 grams (65% yield) of a white solid. The infrared spectrum of the product was in agreement with the structure of 4-t-butylazo-4-(t-butylperoxy)valeric acid.

EXAMPLE X

Preparation of 1-(t-Butylazo)-1-phenyl-1-(t-butylperoxy)ethane

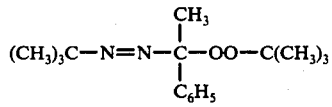

To a solution of 2.0 grams (.025 moles) of 50% sodium hydroxide in 20 ml. of methanol, cooled to 15° C in a 50 ml. erlenmeyer flask was added 2.77 grams (.0277 moles) of 90% t-butylhydroperoxide slowly and with rapid stirring. After the addition was complete, the reaction was stirred for 10 minutes at 10° C. To the above solution was added 4.05 grams (.02 moles) of 1-t-butylazo-1-phenyl-1-chloroethane dropwise over a 15 minute period holding the temperature at 10° C. After the addition was complete, the reaction was stirred fro 30 minutes at 0°-5° C, poured into 150 ml. of ice water and extracted with pentane. The pentane solution was washed with 10% potassium hydroxide solution, water, saturated NaHCO₃ solution, water, dried over anhydrous sodium sulfate, filtered and the pentane evaporated under reduced pressure to leave 3.3 grams (65% yield) of crude 1-t-butylazo-1-phenyl-1-(t-butylperoxy)ethane. The infrared spectrum indicated the product was contaminated to a small extent by 1-t-butylazo -1-phenyl-1-methoxyethane which resulted from the chloro compound reacting to a small extent with the methanol solvent.

EXAMPLE XI

Preparation of 2-(t-Butylazo)-2-(t-butylperoxy)-4,4-dimethylpentane

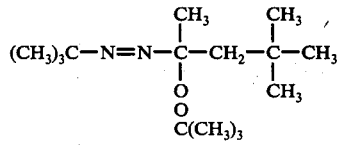

The 2-t-butylazo-2-(t-butylperoxy)-4,4-dimethylpentane was prepared in 78% crude yield from 3.36 grams (.02moles) of 2-t-butylazo-2-chloro-4,4-dimethylpentane, 2.77 grams (.0277 moles) of 90% t-butyl hydroperoxide and 2.0 grams (.025 moles) of 50% NaOH in 20 ml. of methanol. The procedure was the same as that described in Example X.

At a 1.0 weight percent loading the crude azo-peroxide cured the unsaturated polyester-styrene resin of Example II at room temperature giving a peak exotherm of 288° F (143° C) in 7 minutes and a very hard cured resin.

EXAMPLE XII

Preparation of 2-(t-Butylazo)-2-(t-octylperoxy)-4-methylpentane

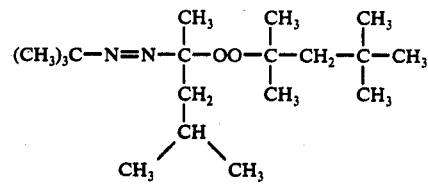

To a solution of 6.57 grams (.0352 moles) of 25% potassium hydroxide solution in a 100 ml. reaction flask, was slowly added 7.0 grams (.045 moles) of 90% t-octyl hydroperoxide holding the temperature at 20°-25° C with a water bath. After the addition was complete the reaction was stirred for 15 minutes at 25° C. The solution was then cooled to 18° C and then 5.3 grams (.026 moles) of 2-t-butylazo-2-chloro-4-methylpentane was added dropwise over a 20 minute period holding the temperature at 20° C with a cold water bath. After the addition was complete the reaction was stirred for 10 minutes at 20° C, cooled to 5° C and stirred for 40 minutes. A portion of 50% NaOH was then added to remove the excess t-octyl hydroperoxide as the water soluble salt. The reaction mixture was poured into 150 ml. of ice cold water and extracted with pentane. The pentane solution was washed with ice cold water, saturated NaHCO, solution and water, dried over anhydrous sodium sulfate, filtered and the pentane evaporated under reduced pressure to leave 9.5 grams (>100% yield) of crude azo-peroxide. The infrared spectra indicated there was some t-octyl alcohol also present (probably from the 90% t-octyl hydroperoxide).

EXAMPLE XIII

Preparation of Di[1-(t-butylazo)cyclohexyl]Peroxide

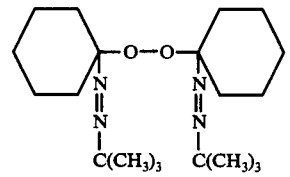

To a solution of 0.78 grams (.01 moles) of sodium peroxide in 30 ml. of methanol, cooled to 10° C in a 50 ml. erlenmeyer flask immersed in a cold water bath was added 4.3 grams (.0213 moles) of 1-t-butylazo-1-chlorocyclo-hexane dropwise and with rapid stirring holding the temperature at 10°-15° C. After the addition was complete, the reaction was stirred for 1 hour at 5° C. It was then poured in 250 ml. of ice cold water and the product extracted with pentane. The pentane layer was separated, washed with saturated (NH₄)₂SO₄, water, saturated NaHCO₃, water, dried, filtered and the pentane evaporated under reduced pressure to give 3.67 grams (85% yield) of crude di[1-(t-butylazo)cyclohexyl] peroxide. The infrared spectrum indicated the product was contaminated to a small extent by 1-t-butylazo-1-methoxy-cyclohexane which resulted from the chloro compound reacting to a small extent with the methanol solvent.

At a 1.0 weight percent loading the crude azo-peroxide cured the unsaturated polyester-styrene resin of Example II at 82° C giving a peak exotherm of 362° F (183° C) in 1.4 minutes.

EXAMPLE XIV

Preparation of Di[2-(t-butylazo)isopropyl] Peroxide

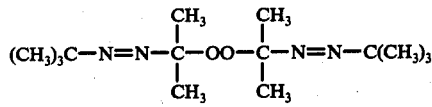

To a solution of 1.95 grams (0.025 moles) of sodium peroxide in 100 ml. of 70% isopropanol, cooled to 15° C in a 200 ml. beaker immersed in a cold water bath was added 8.13 grams (.05 moles) of 2-t-butylazo-2-chloropropane dropwise and with rapid stirring over a 20 minute period holding the temperature at 20° C. After the addition was complete, the reaction was stirred for 40 minutes at 0°-5° C, poured into 200 ml. of ice water and extracted with pentane. The pentane extract was washed with water, dried over anhydrous sodium sulfate, filtered and the pentane evaporated under reduced pressure to leave 5.4 grams (76% yield) of crude azo-peroxide. The infrared spectrum indicated the product was contaminated to some extent with 2-t-butylazo-2-hydroxypropane which resulted from some of the chloro compound reacting with the water in the isopropanol.

EXAMPLE XV

Preparation of 2,5-Dimethyl-2,5-di[2-(t-butylazo)isopropylperoxy]hexane

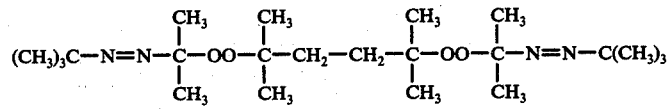

To a solution of 7.17 grams (0.032) moles of 25% potassium hydroxide solution in a 100 ml. reaction flask, was slowly added 3.47 grams (.016 moles) of 82% 2,5-dimethyl-2,5-dihydroperoxy-hexane holding the temperature at 20°-25° C with a water bath. After the addition was complete the reaction was stirred for 40 minutes at room temperature. The solution was then cooled to 15° C and 5.2 grams (.032 moles) of 2-t-butylazo-2-chloropropane was added dropwise over a 35 minute period holding the temperature at 18° C. After the addition was complete the reaction wae stirred for 15 minutes at 18° C, cooled to 0°-5° C and stirred for 90 minutes. The reaction mixture was then poured into 100 ml. of ice water and extracted with pentane. The pentane solution was washed with cold 5% NaOH, water, saturated NAHCO$_3$ solution, dried over anhydrous sodium sulfate, filtered and the pentane evaporated under reduced pressure to leave 5.1 grams (75% yield) of crude azo-peroxide. The infrared spectrum indicated the product was contaminated with a small amount of 2-t-butylazo-2-hydroxypropane which results from some of the chloro compound reacting with the water.

EXAMPLE XVI

Preparation of Di [1-(t-butylazo)-1,3-dimethylbutyl] Peroxide

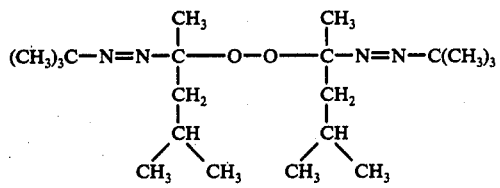

A slurry of the sodium salt of 2-t-butylazo-2-hydroperoxy-4-methylpentane in dioxane was prepared by slurrying 1.15 grams (.0272 moles) of 57% sodium hydride in 50 ml. of dioxane in a 100 ml. reaction flask equipped with a magnetic stirrer, thermometer, addition funnel and gas outlet, cooling the slurry to 0°-5° C, and slowly adding 10.95 grams (.0272 moles) of a 50% solution of 2-t-butylazo-2-hydroperoxy-4-methylpentane in odorless mineral spirits. After the addition of the hydroporoxide was complete, the reaction was stirred for 2 hours at 5° C and then 5.55 grams (.0272 moles) of 2-t-butylazo-2-chloro-4-methylpentane was added dropwise holding the temperature at 5° C. After the addition was complete, the reaction was stirred for an additional 2 hours at 5° C, poured into 200 ml. of ice water and extracted with pentane. The pentane solution was washed with water, saturated NaHCO$_3$ solution, dried over anhydrous sodium sulfate, filtered and the pentane evaporated under reduced pressure to leave 14.8 grams (89% yield) of the crude azo-peroxide, approximately 5.9 grams being odorless mineral spirits.

At a 0.6 weight percent loading the crude di(1-t-butylazo-1,3-dimethylbutyl) peroxide cured the unsaturated polyesterstyrene resin of Example II at room temperature giving a peak exotherm of 270° F (132°C) in 4.0 minutes and a very hard cured resin.

In the polymerization of vinyl chloride as in Example III, it was found that 0.10 grams of di(1-t-butylazo-1,3-dimethylbutyl) peroxide were required per 100 grams of vinyl chloride monomer to obtain 53% conversion using cycle of 16 hours at 30° C.

EXAMPLE XVII

Preparation of 2-(t-Butylazo)isopropyl 1-(t-Butylazo)-1,3-dimethylbutyl Peroxide

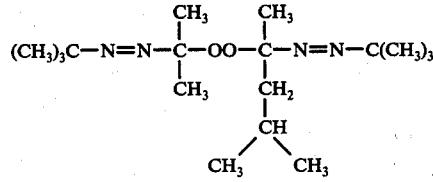

A slurry of the sodium salt of 2-t-butylazo-2-hydroperoxy-4-methylpentane in dimethylformamide was prepared by slurrying 1.29 grams (0.0306 moles) of 57% sodium hydride in 100 ml. of dimethylformamide in a 250 ml. reaction flask equipped with a magnetic stirrer, thermometer, addition funnel and gas outlet, cooling the slurry to 0°-5° C, and slowly adding 8.85 grams (0.0306 moles) of 55% solution of 2-t-butylazo-2-hydroperoxypropane in hexane. After the addition of the hydroperoxide was complete, the reaction was stirred for 45 minutes at 0° to 5° C. a 50 ml. portion of hexane was added to reduce the viscosity and then 6.2 grams (.0306 moles) of 2-t-butylazo-2-chloro-4-methylpentane was added dropwise holding the temperature at 5° C. After the addition was complete, the reaction was stirred for 30 minutes at 0° C, poured into 200 ml. of ice cold water, the hexane layer separated and washed with ice cold water, saturated $NaHCO_3$ solution and water. The hexane solution was dried over anhydrous sodium sulfate, filter and the solvent evaporated under reduced pressure to leave 8.0 grams (80% yield) of the crude azo-peroxide.

The infrared spectrum of the crude azo-peroxide was in agreement with the structure of 2-t-butylazo-isopropyl 1-t-butylazo-1,3-dimethylbutyl peroxide.

At a 1.0 weight percent loading the crude 2-t-butylazoisopropyl 1-t-butylazo-1,3-dimethylbutyl peroxide cured the unsaturated polyester-styrene resin of Example II at room temperature giving a peak exotherm of 237° F (113° C) in 11.2 minutes and a hard cured resin.

EXAMPLE XVIII

Preparation n-Butyl 4-(t-Cumylazo)-4-(t-butylperoxy)-valerate

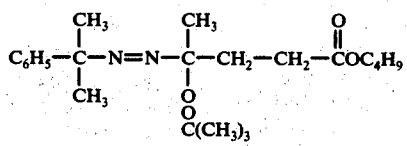

To a cooled solution of 2.96 grams (.0132 moles) of 25% potassium hydroxide solution in a 100 ml. reaction flask eqipped with a magnetic stirrer, thermometer and addition funnel was added 1.72 grams (0.0172 moles) of 90% t-butyl hydroperoxide. The reaction mixture was stirred 20 minutes at 15° C and then 4.25 grams (.0123 moles) of n-butyl 4-t-cumylazo-4-chlorovalerate was added drowise over a 20 minute period keeping the temperature at 15° to 20° C. After the addition was complete the reaction was stirred for 20 minutes at 20° C, cooled to 0° C and stirred an additional 30 minutes. A small portion of 50% sodium hydroxide was then added to react with the excess t-butyl hydroperoxide and the reaction stirred for an additional 15 minutes, poured into 100 ml. of ice cold water and the product extracted with pentane. The pentane solution was washed with ice cold water, saturated $NaHCO_3$ solution and water. The pentane solution was dried over anhdrous sodium sulfate, filtered and the pentane evaporated under reduced pressure to leave 4.1 grams (82% yield) of crude azo-peroxide.

The infrared spectrum of the crude azo-peroxide was in agreement with the structure of n-butyl 4-t-cumylazo-4-(t-butylperoxy)valerate.

At a 0.25 weight percent loading the crude n-butyl 4-t-cumylazo-4-(t-butylperoxy)valerate cured the unsaturated polyester-styrene resin of Example II at room temperature giving a peak exotherm of 159° F (71° C) in 7.9 minutes.

EXAMPLE XIX

Preparation of 2-(t-Butylazo)isopropyl 1-(t-Butylazo)-1,3-dimethyl-3-methoxybutyl Peroxide

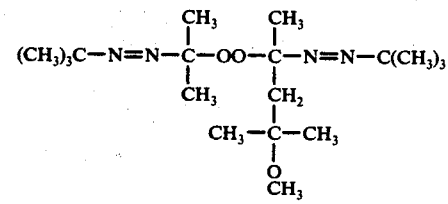

A slurry of the sodium salt of 2-t-butylazo-2-hydroperoxy-4-methylpentane in hexane was prepared by slurrying 1.18 grams (.028 moles) of 57% sodium hydride in 150 ml. of hexane in a 250 ml. reaction flask equipped with a magnetic stirrer, thermometer, addition funnel and gas outlet, cooling the slurry to 0°-5° C, and slowly adding 8.1 grams (.028 moles) of a 55% solution of 2-t-butylazo-2-hydroperoxypropane in hexane. After the addition of the hydroperoxide was complete, the reaction was stirred for 20 minutes at 5° C. To the above slurry was added 6.56 grams (.028 moles) of 2-t-butylazo-2-chloro-4-methoxy-4-methylpentane dropwise holding the temperature at 5°-10° C. After the addition was complete, the reaction was stirred for 30 minutes at 10° C, poured into 150 ml. of ice cold water, the hexane layer separated and washed with ice cold water, saturated $NaHCO_3$ solution and water. The hexane solution was dried over anhydrous sodium sulfate, filtered and the solvent evaporated under reduced pressure to leave 9.0 grams (90% yield) of the crude azo-peroxide.

The infrared spectrum of the crude azo-peroxide was in agreement with the structure of 2-t-butylazo-isopropyl1-t-butylazo-1,3-dimethyl-3-methoxybutyl peroxide.

At a 1.0 weight percent loading the crude azo-peroxide cured the unsaturated polyester-styrene resin of Example II at room temperature giving a peak exotherm of 237° F (114° C) in 11.2 minutes and a very hard cured resin.

EXAMPLE XX

Preparation of 2-(t-Butylazo)-2-(t-amylperoxy)-4-methylpentane

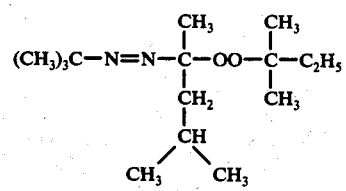

To a cooled solution of 5.66 grams (.0253 moles) of 25% potassium hydroxide solution in a 100 ml. reaction flask equipped with a magnetic stirrer, thermometer and addition funnel was added 3.72 grams (.0322 moles) of 90% t-amyl hydroperoxide. The reaction mixture was stirred for 20 minutes at 20° C and then cooled to 15° C. To the above solution was added 4.7 grams (0.023 moles) of 2-t-butylazo-2-chloro-4-methylpentane dropwise over 30 minutes holding the temperature at 20° C.

After the addition was complete, the reaction was stirred for 15 minutes at 20° C, cooled to 5° C and stirred an additional 30 minutes. A small portion of 50% sodium hydroxide was then added to react with the excess t-amyl hydroperoxide and the reaction stirred for an additional 15 minutes, poured into 100 ml. of ice cold water and the product extracted with pentane. The pentane solution was washed with ice cold water, saturated NaHCO₃ solution and water. The pentane solution was dried over anhydrous sodium sulfate, filtered and the pentane evaporated under reduced pressure to leave 6.24 grams (96% yield) of crude azo-peroxide.

The infrared spectrum of the crude azo-peroxide was in agreement with the structure of 2-t-butylazo-2-t-amylperoxy-4-methylpentane.

At a 0.5 weight percent loading the crude 2-t-butylazo-2-t-amylperoxy-4-methylpentane cured the unsaturated polyesterstyrene resin of Example II at room temperature giving a peak exotherm of 319° F (160° C) in 2.8 minutes and a very hard cured resin.

EXAMPLE XXI

Preparation of 2-(t-Amylazo)-2-(t-butylperoxy)-4-methylpentane

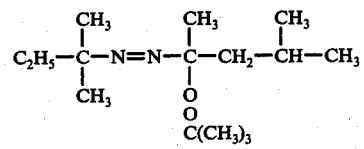

To a cooled solution of 9.1 grams (.0407 moles) of 25% potassium hydroxide solution in a 100 ml. reaction flask equipped with a magnetic stirrer, thermometer and addition funnel was added 5.2 grams (.052 moles) of 90% t-butyl hydroperoxide. The reaction mixture was stirred for 30 minutes at 25° C and then cooled to 18° C. To the above solution was added 8.06 grams (0.037 moles) of 2-t-amylazo-2-chloro-4-methylpentane dropwise over 15 minutes holding the temperature at 18°-22° C with a cold water bath. After the addition was complete, the reaction was stirred for 10 minutes at 20° C, cooled to 5° C and stirred an additional 40 minutes. A small portion of 50% sodium hydroxide was then added to react with the excess t-butyl hydroperoxide and the reaction stirred for an additional 15 minutes, poured into 150 ml. of ice cold water and the product extracted with pentane. The pentane solution was washed with ice cold water, saturated NaHCO₃ solution and water. The pentane solution was dried over anhydrous sodium sulfate, filtered and the pentane evaporated under reduced pressure to leave 8.3 grams (83% yield) of crude 2-t-amylazo-2-(t-butylperoxy)-4-methylpentane.

At a 1.0 weight percent loading the crude 2-t-amylazo-2-(t-butylperoxy)-4-methylpentane cured the unsaturated polyester-styrene resin of Example II at room temperature giving a peak exotherm of 317° F (159° C) in 217 minutes and a very hard cured resin.

EXAMPLE XXII

Preparation of 2-(t-Butylazo)-2-(t-amylperoxy)-4-methoxy-4-methylpentane

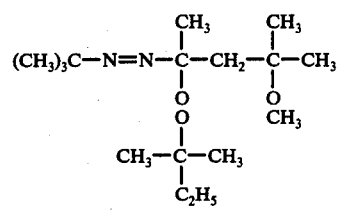

The 2-t-butylazo-2-(t-amylperoxy)-4-methoxy-4-methylpentane was prepared in 97% crude yield from 7.78 grams (0.0331 moles) of 2-t-butylazo-2-chloro-4-methoxy-4-methylpentane, 5.35 grams (0.0464 moles) of 90% t-amyl hydroperoxide and 7.92 grams (0.0353 moles) of 25% potassium hydroxide solution. The procedure was the same as that described in Example XX. The infrared spectrum of the product indicated there was a small amount of 2-t-butylazo-2-hydroxy-4-methoxy-4-methylpentane present in the product.

At a 1.0 weight percent loading the crude 2-t-butylazo-2-(t-amylperoxy)-4-methoxy-4-methylpentane cured the unsaturated polyester-styrene resin of Example II at room temperature giving a peak exotherm of 335° F (167° C) in 2.6 minutes and a very hard cured resin.

EXAMPLE XXIII

Preparation of 2-(t-Butylazo)-2-(t-amylperoxy)-propane

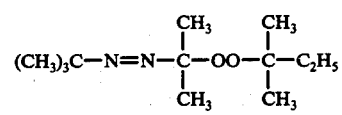

The 2-t-butylazo-2-(t-amylperoxy)-prpane was prepared in 83% crude yield from 7.07 grams (0.0435 moles) of 2-t-butylazo-2-chloropropane, 7.05 grams (.061 moles) of 90% t-amyl hydroperoxide and 10.25 grams (.0467 moles) of 25% potassium hydroxide solution. The procedure was the same as that described in Example XX. The infrared spectrum of the product indicated there was a small amount of 2-t-butylazo-2-hydroxypropane present in the product.

At a 1.0 weight percent loading the crude 2-t-butylazo-2-(t-amylperoxy)-propane cured the unsaturated polyesterstyrene resin of Example II at room temperature giving a peak exotherm of 314° F (157° C) in 3.3 minutes and a very hard cured resin.

EXAMPLE XXIV

Preparation of 1-(t-Butylazo)1-1(t-amylperoxy)cyclohexane

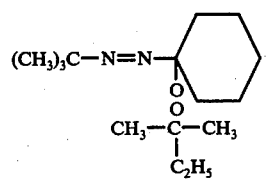

The 1-t-butylazo-1-(t-amylperoxy)cyclohexane was prepared in 85% crude yield from 7.5 grams (.037 moles) of 1-t-butylazo-1-chlorocyclohexane, 6.0 grams (.052 moles) of 90% t-amyl hydroperoxide and 9.1 grams (.0407 moles) of 25% potassium hydroxide solution. The procedure was the same as that described in Example XX. The infrared spectrum of the product indicated there was a small amount of 1-t-butylazo-1-hydroxycyclohexane present in the product.

At a 1.0 weight percent loading the crude 1-t-butylazo-1-(t-amylperoxy)-cyclohexane cured the unsaturated polyesterstyrene resin of Example II at room temperature giving a peak exotherm of 328° F (164° C) in 3.1 minutes and a very hard cured resin.

EXAMPLE XXV

Preparation of 2,5-Dimethyl-2,5-di[1-(t-butylazo)-3-methoxy-1,3-dimethylbutylperoxy]-hexane

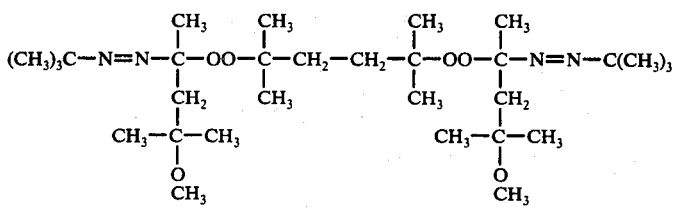

To a cooled slurry of 2.47 grams (.0586 moles) of 57% sodium hydride in 100 ml. of hexane in a 250 ml. 4 neck round bottom flask, equipped with a magnetic stirrer, thermometer, addition funnel and gas outlet, was slowly added 3.88 grams (.0196 moles) of 90% 2,5-dimethyl-2,5-dihydroperoxy-hexane containing 8% water. After the addition was complete, the reaction was stirred for 5 hours at 25° to 30° C, cooled to 15° C in a cold water bath and 9.2 grams (0.0392 moles) of 2-t-butylazo-2-chloro-4-methoxy-4-methylpentane was added dropwise holding the temperature at 15° to 20° C. After the addition was complete the reaction was stirred for 15 minutes at 15° C, cooled to 0° C, stirred for 30 minutes and poured into 200 ml. of ice water. The hexane layer was separated, washed with ice cold water, saturated NaHCO₃ solution, dried over anhydrous sodium sulfate, filtered and the hexane evaporated under reduced pressure while holding the temperature of the solution below 10° C. The product was a light yellow liquid weighing 9.1 grams (81% yield).

At a 1.0 weight percent loading the crude azo-peroxide cured the unsaturated polyester-styrene resin of Example II at room temperature giving a peak exotherm of 251° F (122° C) in 6.8 minutes and a very hard cured resin.

EXAMPLE XXVI

Preparation of 2,5-Dimethyl-2,5-di[1-(t-butylazo)cyclohexylperoxy]-hexane

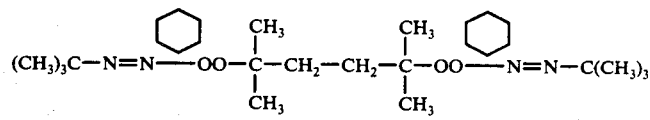

To a cooled slurry of 2.47 grams (.0586 moles) of 57% sodium hydride in 80 ml. of dioxane in a 250 ml. 4 neck round bottom flask equipped with a magnetic stirrer, thermometer, addition funnel and gas outlet, was slowly added 3.88 grams (0.0196 moles) of 90% 2,5-dimethyl-2,5-dihydroperoxy-hexane containing 8% water. After the addition was complete the reaction was stirred for 4 hours at 30° C, cooled to 15° C in a cold water bath and 7.96 grams (.0392 moles) of 1-t-butylazo-1-chlorocyclohexane was added dropwise holding the temperature at 15° to 20° C. After the addition was complete the reaction was stirred for 30 minutes at 15° to 20° C and poured into 200 ml. of ice cold water. The product was extracted with 50 ml. of cold pentane, the pentane solution washed with ice cold water, saturated NaHCO₃ solution, dried over anhydrous sodium sulfate, filtered and the pentane evaporated under reduced pressure while holding the temperature of the solution below 10° C. The product was a light yellow liquid weighing 8.0 grams (80% yield). The infrared spectrum of the crude azo-peroxide was in agreement with the stucture of the desired product.

At a 1.0 weight percent loading the crude azo-peroxide cured the unsaturated polyester-styrene resin of Example II at room temperature giving a peak exotherm of 229° F (109° C) in 9.9 minutes and a very hard cured resin.

EXAMPLE XXVII

Preparation of 2,5-Dimethyl-2,5-di[1-(t-butylazo) 1,3-dimethylbutylperoxy]hexane

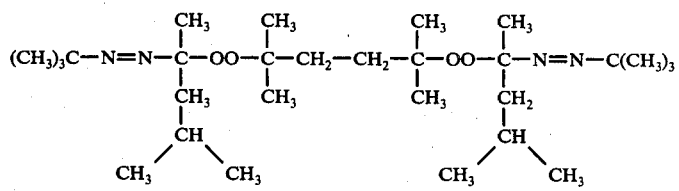

To a solution of 4.12 grams (0.022 moles) of 95%, 2,5-dimethyl-2,5-dihydroperoxy-hexane and 3.36 grams (0.042 moles) of 50% sodium hydroxide in 50 ml. of methanol, cooled to 0° C in a 125 ml. erlenmeyer flask immersed in an ice bath, was added 8.2 grams (.04 moles) of 2-t-butylazo-2-chloro-4-methylpentane dropwise. After the addition was complete the reaction was stirred for 1 hour at 5° C, poured into 250ml. of ice water and the product extracted with pentane. The pentane layer was separated, washed with ice cold 10% potassium hydroxide, water, saturated NaHCO$_3$ solution, water, dried over anhydrous sodium sulfate, filtered and the pentane evaporated under reduced pressure, while holding the temperature below 10° C, to leave 8.3 grams (80.6%) of the crude difunctional azo-peroxide. The infrared spectrum was in agreement with the structure of the desired product. However, it also indicated there was some 2-t-butylazo-2-methoxy-4-methylpentane and either or both 2,5-dimethyl-2,5-dihydroperoxy-hexane and 2,5-dimethyl-2-[(1-t-butylazo-1,3-dimethylbutyl)peroxy]-5-hydroperoxyhexane also present due to side reactions of the 2-t-butylazo-2-chloro-4-methylpentane with the methanol solvent.

What is claimed is:

1. An α-peroxyazo compound of the formula (R")$_3$C—N=N—C(R$_1$)(R$_2$)—OOR where:

(R")$_3$C is t-alkyl or t-aralkyl were the R"s are the same or different and are selected from alkyl of 1–5 carbons or phenyl, not more than one R" being phenyl;

R is —C(R")$_3$, —C(R'$_1$)(R'$_2$)—N=N—C(R")$_3$ or

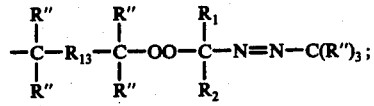

R, R'$_1$, R$_2$ and R'$_2$ are separately selected from alkyl of 1–5 carbons; alkyl of 1–5 carbons substituted with lower alkoxy, carboxy or lower alkoxycarbonyl; phenyl; or join with their common atom to form cyclohexyl; and R$_{13}$ is C$_1$–C$_6$ alkylene.

2. An α-peroxyazo compound of the formula:

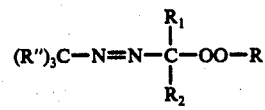

wherein:
(R")$_3$C is t-alkyl, t-cycloalkyl, t-alkylcycloalkyl, t-arylcycloalkyl or t-aralkyl of 4–20 carbons wherein the R"s are the same or different and are selected from alkyl, alkenyl or alkynyl of 1–8 carbons, C$_7$–C$_{12}$ aralkyl and C$_6$–C$_{14}$ aryl and not more than one R" is aryl, or wherein 2 or 3 of said R"s join with the tertiary carbon atom to form cyclo-, bicyclo- or tricyclo- alkyl of 3–12 carbons, R is —C(R")$_3$,

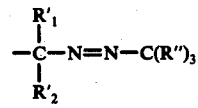

or

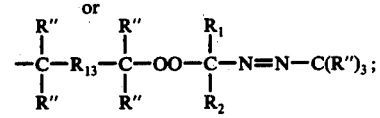

R$_1$, R'$_1$, R$_2$ and R'$_2$ are separately selected from C$_1$–C$_8$ alkyl, C$_3$–C$_{12}$ cyclo-, bicyclo-, or tricycloalkyl, C$_7$–C$_{12}$ aralkyl, and C$_6$–C$_{14}$ aryl, or, taken together with the common carbon atom to which they are attached, R$_1$ and R$_2$ and R'$_1$ and R'$_2$ join to form C$_4$–C$_{12}$ cycloalkyl, or one or more of each of said R$_1$s, R'$_1$s, R$_2$s and R'$_2$s is as above-defined and is substituted with lower alkoxy, hydroxy, carboxy, lower alkoxycarbonyl, lower alkylcarbonyloxy, halo, cyano, dimethylamido or lower alkylsulfonato; and R$_{13}$ is alkylene, alkynylene or alkenylene of 1–6 carbons or C$_6$–C$_9$ arylene.

3. 2-(t-Butylazo)-2-(t-butylperoxy)-propane.
4. 2-(t-Butylazo)-2-(t-butylperoxy)-4-methylpentane.
5. 2-(t-Butylazo)-2-(t-butylperoxy)-4-methoxy-4-methylpentane.
6. Di[1-(t-butylazo)-1,3-dimethylbutyl]peroxide.
7. 2-(t-Butylazo)-2-(t-amylperoxy)-4-methylpentane.
8. 2,5-Dimethyl-2,5-di[1-(t-butylazo)cyclohexylperoxy]hexane.

* * * * *